United States Patent
Higuchi

(10) Patent No.: US 8,184,871 B2
(45) Date of Patent: May 22, 2012

(54) BIOMETRICAL FEATURE INPUTTING SYSTEM, IMAGE SYNTHESIZING APPARATUS, AND IMAGE SYNTHESIZING METHOD

(75) Inventor: Teruyuki Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 986 days.

(21) Appl. No.: 12/138,956

(22) Filed: Jun. 13, 2008

(65) Prior Publication Data

US 2008/0310690 A1  Dec. 18, 2008

(30) Foreign Application Priority Data

Jun. 13, 2007  (JP) .................. 2007-156123

(51) Int. Cl.
*G06K 9/00* (2006.01)
(52) U.S. Cl. ........................................ 382/124
(58) Field of Classification Search .......... 382/124; 348/36
See application file for complete search history.

(56) References Cited

U.S. PATENT DOCUMENTS

| | | | | |
|---|---|---|---|---|
| 7,623,781 B1* | 11/2009 | Sassa | ................ | 396/322 |
| 2008/0260214 A1* | 10/2008 | Hauke et al. | ................ | 382/124 |

FOREIGN PATENT DOCUMENTS

| | | |
|---|---|---|
| JP | 4-168432 A | 6/1992 |
| JP | 587744 A | 4/1993 |
| JP | 7-98216 A | 4/1995 |
| JP | 9-198485 A | 7/1997 |
| JP | 11-004373 A | 1/1999 |
| JP | 200018927 A | 1/2000 |
| JP | 200281912 A | 3/2002 |
| JP | 2006-312064 A | 11/2006 |

OTHER PUBLICATIONS

Office Action dated Jul. 29, 2011, issued in counterpart Chinese Application No. 200810125445.7.

* cited by examiner

*Primary Examiner* — John Strege
(74) *Attorney, Agent, or Firm* — Sughrue Mion, PLLC

(57) ABSTRACT

A biometrical feature inputting system including: an imager placed in front of a finger, for imaging an image of a front face of the finger, and an image of either one of lateral faces of the finger; a reflector placed on at least one side of lateral faces of the figure, for reflecting an image of lateral faces of the finger to the imager; and a synthesizer for applying mirror inversion to an imaged image of lateral faces of the finger, and synthesizing a mirror-inverted image of lateral faces of the finger and an imaged image of a front face of the finger.

17 Claims, 9 Drawing Sheets

31 IMAGE DATA BEFORE SYNTHESIS

41 IMAGE DATA DURING SYNTHESIS

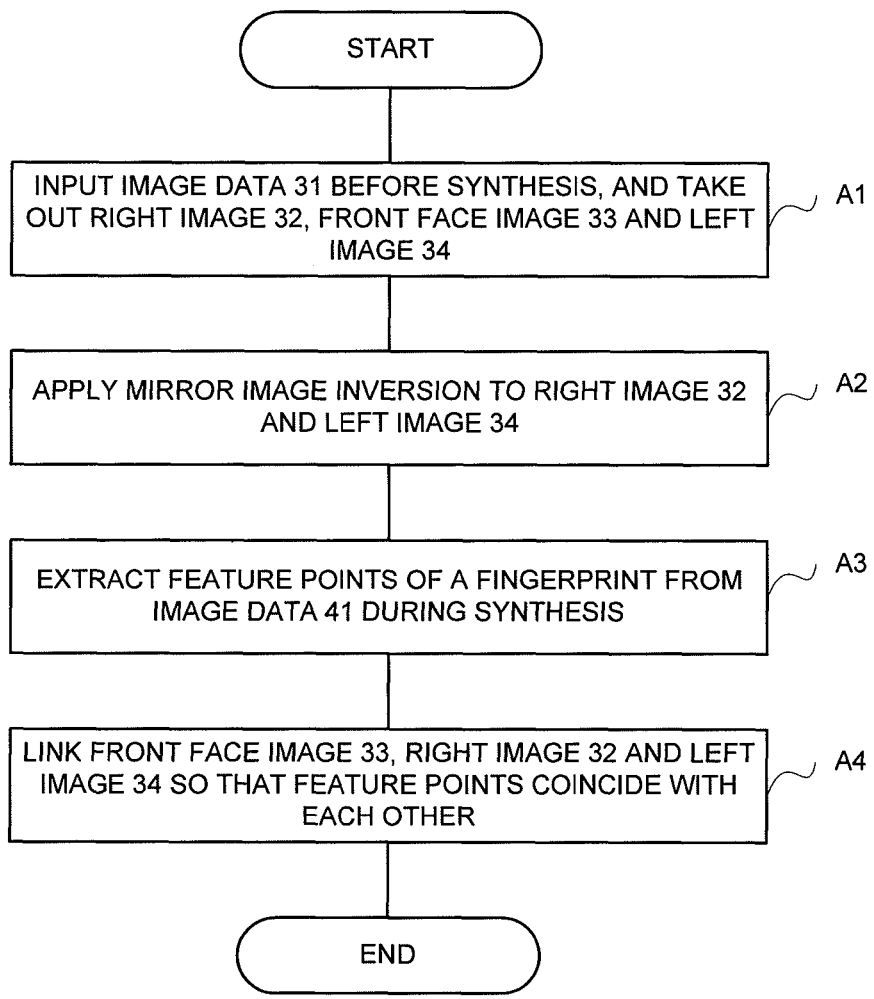
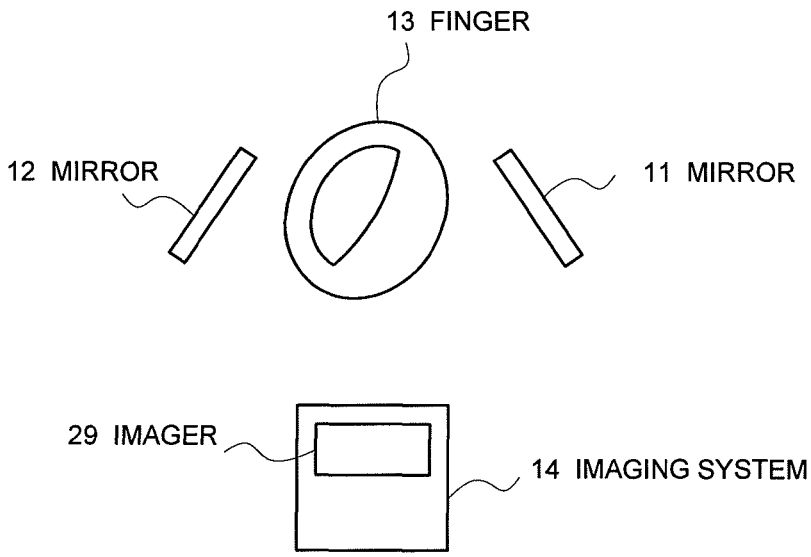

FIG. 9
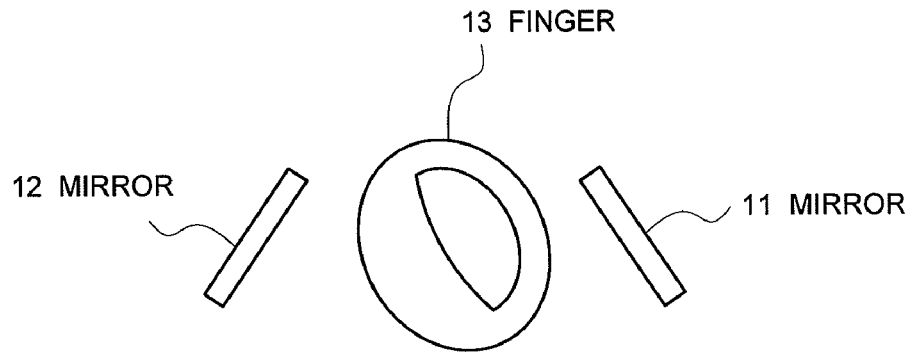
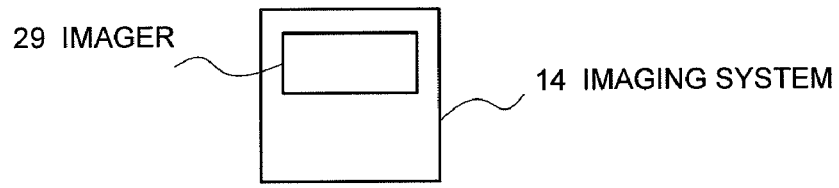
FIG. 10
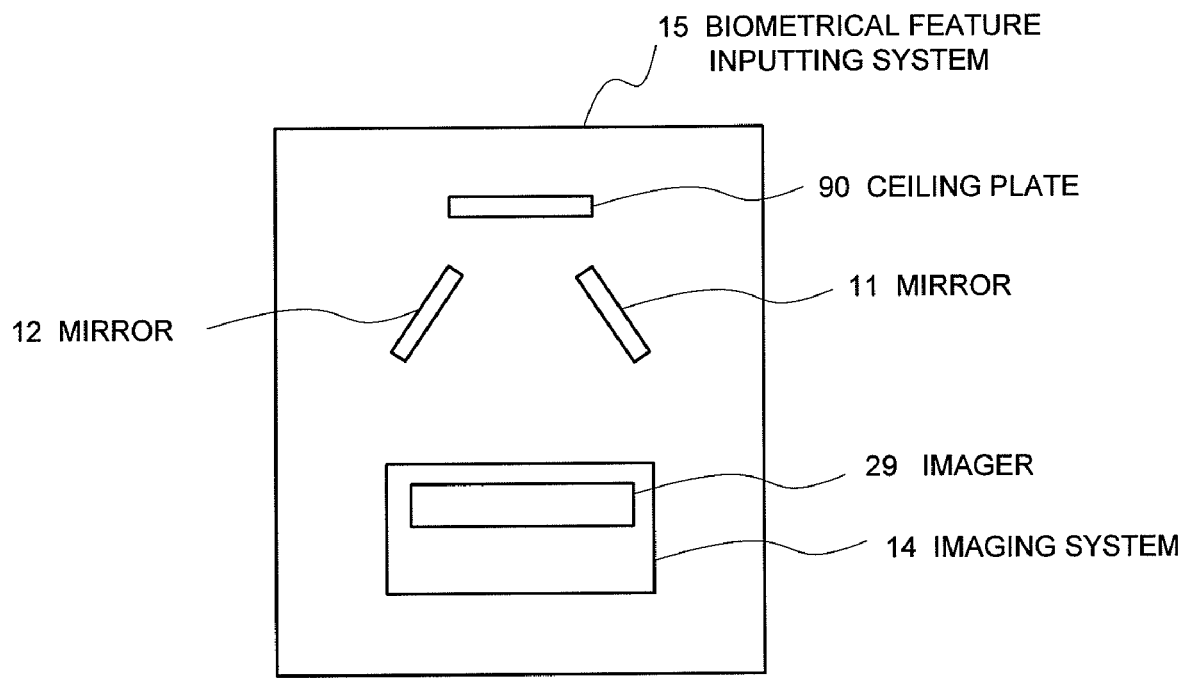

BIOMETRICAL FEATURE INPUTTING SYSTEM, IMAGE SYNTHESIZING APPARATUS, AND IMAGE SYNTHESIZING METHOD

INCORPORATION BY REFERENCE

This application is based upon and claims the benefit of priority from Japanese patent application No. 2007-156123, filed on Jun. 13, 2007, the disclosure of which is incorporated herein in its entirety by reference.

RELATED ART

The present invention relates to a biometrical feature inputting system, an image synthesizing apparatus, an image synthesizing method, and an image synthesizing program.

A technology described in JP-P2002-81912A discloses one in which a camera takes images together of a top face of a leg and a mirror image of a lateral face of the leg, which appears in a mirror body. However, this technology is not one for synthesizing an image in which the leg top face is linked to the mirror image of the leg lateral face that appears in the mirror body.

A technology described in JP-P1993-87744A discloses one for concurrently taking images of a front face and a lateral face of a tablet using a prism placed right and left. However, this technology is not one for synthesizing an image in which the images of the front face and the lateral face of the tablet are linked to each other.

A technology described in JP-P2000-18927A discloses one in which mirrors are placed all around so that a lateral face of a semiconductor can be taken in as an image together with a top face thereof. However, this technology is not one for synthesizing an image in which the images of the top face and the lateral face of the semiconductor are linked to each other.

In the above-mentioned technologies, there is a task that it is impossible to synthesize an image in which an image imaged directly by imaging means and an image imaged by mirror image inversion using a mirror, a prism or the like are linked to each other

SUMMARY OF THE INVENTION

The present invention is made to solve the above-mentioned task.

An exemplary object of the present invention is to provide a biometrical feature inputting system, an image synthesizing apparatus, an image synthesizing method, and an image synthesizing program for solving the above-mentioned task.

The present invention to solve the above-described task is a biometrical feature inputting system including: an imager placed in front of a finger, for imaging an image of a front face of the above-described finger, and an image of either one of lateral faces of the above-described finger; a reflector placed on at least one side of lateral faces of the above-described figure, for reflecting an image of lateral faces of the above-described finger to the above-described imager; and a synthesizer for applying mirror inversion to an imaged image of lateral faces of the above-described finger, and synthesizing a mirror-inverted image of lateral faces of the finger and an imaged image of a front face of the finger.

Also, the present invention to solve the above-described task is an image synthesizing apparatus including: an input section to which an image is input, the above-described image including a first image and a second image separately from each other on an identical plane; and a synthesizer for, out of the above-described images that are input, applying mirror inversion to the above-described first image, and linking it to the above-described second image to synthesize an image.

Furthermore, the present invention to solve the above-described task is an image synthesizing method including steps of: inputting an image including a first image and a second image separately from each other on an identical plane; applying mirror inversion to the above-described first image; and synthesizing an image by linking the above-described inverted first image to the above-described second image.

In accordance with the present invention, an image including a first image and a second image separately from each other on an identical plane is input, and the mirror inversion is applied to the first image, and it is linked to the second image, and thereby, an image can be synthesized.

BRIEF DESCRIPTION OF THE DRAWINGS

This and other objects, features and advantages of the present invention will become more apparent upon a reading of the following detailed description and drawings, in which:

FIG. 7 is a processing flowchart of the image synthesizer;

FIG. 8 is a diagram showing a variation of positions of a finger;

FIG. 9 is a diagram showing a variation of positions of a finger;

FIG. 10 is a diagram showing a configuration of a biometrical feature inputting system of a third exemplary embodiment;

EXEMPLARY EMBODIMENTS

Figure 1:
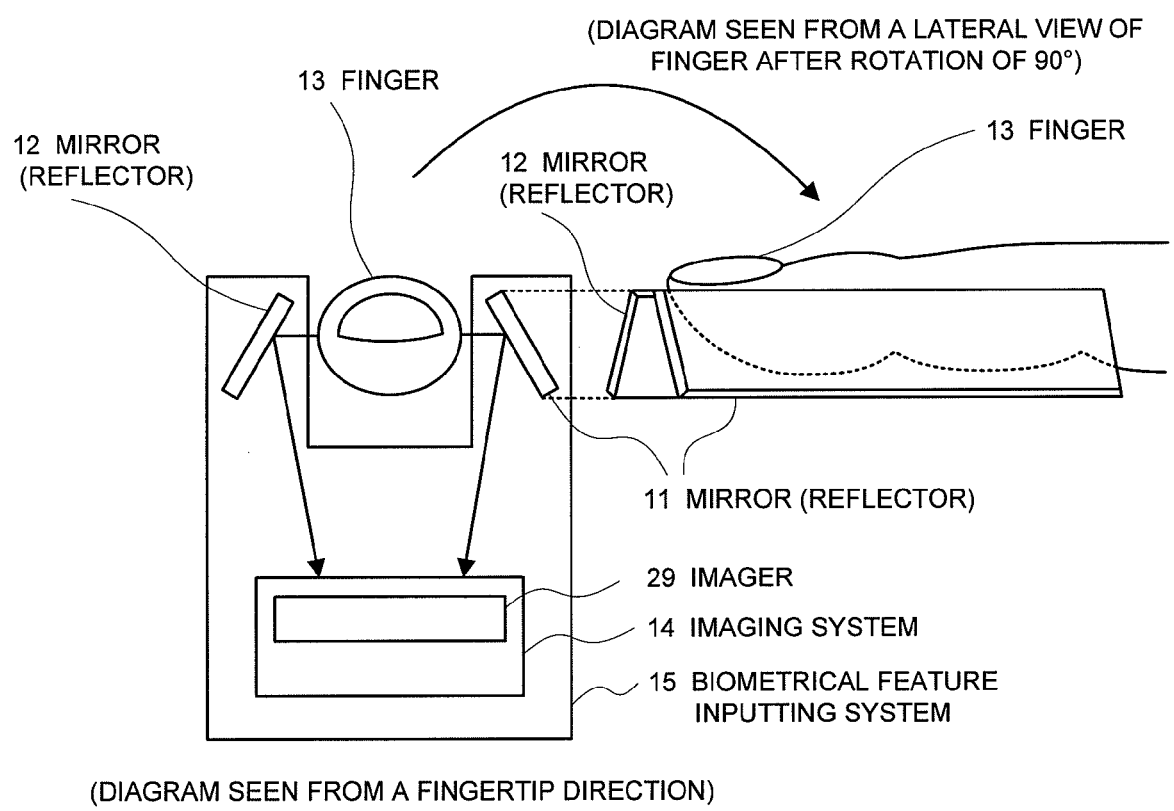
FIG. 1 is a diagram showing a whole configuration of a biometrical feature inputting system.

Now, exemplary embodiments for carrying out the present invention will be explained in detail referring to the drawings.

First Exemplary Embodiment

FIG. 1 shows a biometrical feature inputting system 15 of this exemplary embodiment.

The biometrical feature inputting system 15 of this exemplary embodiment is one for authenticating an individual by means of a biometrical feature such as a fingerprint or a blood vessel of a finger 13. This system measures a biometrical feature of the finger 13 from three directions by concurrently imaging not only a front face but also a lateral face of the finger 13 using an imager 29 in one imaging system 14. Thereby, deterioration of an authentication accuracy due to a rotation of the finger 13 can be prevented.

The biometrical feature inputting system 15 is configured of mirrors 11 and 12 placed on each side of right and left lateral faces of the FIG. 13, and the imaging system 14. A left-hand side of FIG. 1 shows a diagram of the biometrical feature inputting system 15 as seen from a fingertip direction of the finger 13 that is an object to be input. FIG. 1 further shows the mirrors 11 and 12, and the finger 13 from a lateral view of the finger 13.

In addition, the notation of directions of the finger 13 is as follows: A side facing to the imaging system 14 is a front face, and an opposite side thereof is a back face. A side generally perpendicular to the front face and the back face is a lateral face. One side of the lateral face is right, and the other is left. Also, a side on which a fingerprint of the FIG. 13 exists is a ball of the finger. An opposite side of the ball is the back thereof. A face generally perpendicular to the ball and back is a side face. One side of the side face is a right-lateral side, and the other is a left-lateral side. In FIG. 1, the ball of the finger 13 is facing to the front face. In FIG. 8, the finger 13 rotates, and the ball thereof is facing to a direction of the lateral face. In FIG. 1, the front face is facing downwardly, but it is not limited to this.

In FIG. 1, the mirrors 11 and 12 (referred to as reflectors, also) placed on each side of right and left lateral faces of the FIG. 13 capture images of the lateral faces of the finger 13, and reflect them in a direction of the front face. The mirrors 11 and 12 are placed so that the reflected images can be imaged by the imaging system 14 in front of the finger 13. In other words, the mirrors 11 and 12 are placed with an angle so that a distance therebetween becomes greater on a side of the front face of the finger 13 and becomes smaller on a side of the back face. The reflection surfaces of the mirrors are arranged on a side of the finger. The imaging system 14 concurrently images a section of the lateral faces and a section of the front face of the finger 13, which are captured on the mirrors 11 and 12. In addition, other object for reflecting a light can be substituted for the mirrors 11 and 12. The substitute object includes a metal plate and a plastic plate.

Figure 2:
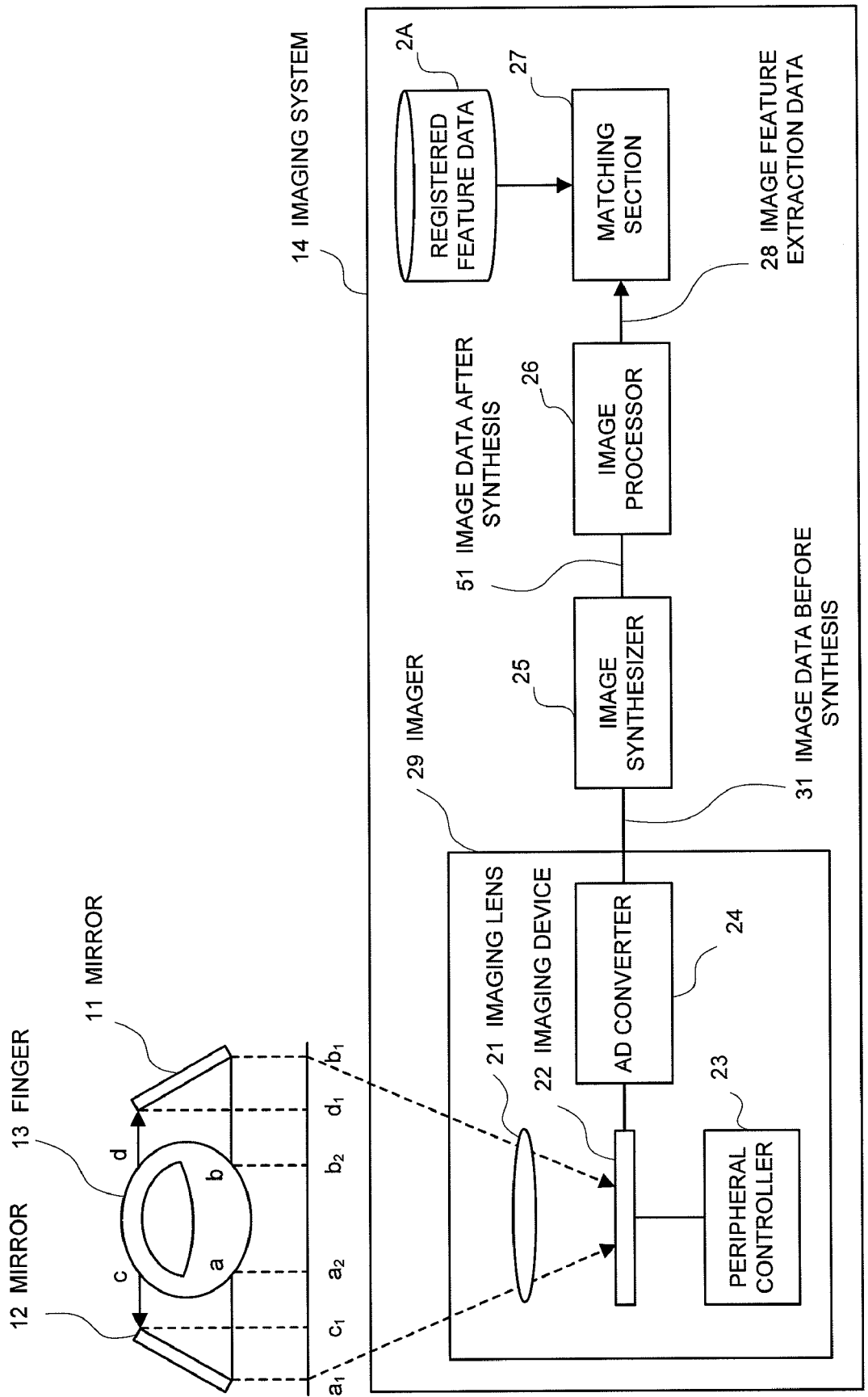
FIG. 2 is a diagram showing a configuration of an imaging system.

FIG. 2 shows a detailed configuration of the imaging system 14. An imaging lens projects a section of the front face of the finger 13 and a section of the lateral face of the finger 13, which has been reflected by the mirrors 11 and 12, onto an imaging device 22. An AD converter 24 and a peripheral controller 23 convert images of the finger 13, which are projected onto the imaging device 22, into an image data 31 before synthesis, and send it to an image synthesizer 25. The image synthesizer 25 takes out a front face image 33, and lateral face images (a right image 32 and a left image 34) that are reflected from the mirrors 11 and 12 and imaged from the input image data 31 before synthesis. Also, the image synthesizer links them to each other so that they continue, and outputs an image data 51 after synthesis, which contains data of both the front face and lateral face, to an image processor 26. The image processor 26 extracts an image feature such as a fingerprint and a blood vessel from the image data 51 of the finger 13 after synthesis, and outputs an image feature extraction data 28 to a matching section 27. The matching section 27 matches the image feature extraction data 28 to a registered feature data 2A such as a fingerprint and a blood vessel, which is registered in advance in a database that is not shown in the figures. Based on a result of this matching, an individual is authenticated.

In addition, the imaging lens 21, the imaging device 22, the peripheral controller 23 and the AD converter 24 configure an imager 29. Also, the imaging device 22 is configured by an image sensor such as a CCD and a CMOS.

The peripheral controller 23, the image processor 26 and the matching section 27 are configured by a processor, a memory, a program or the like, and optimally conduct image processing of a fingerprint or a blood vessel image, and conduct a registration or matching of a measured data. They can be configured by hardware as an exclusive device. Since the peripheral controller 23, the image processor 26 and the matching section 27, and the AD converter 24 are known to a skilled person in the art, and also, are not related to the present invention directly, the explanation of a detailed configuration thereof is omitted.

Figure 6:
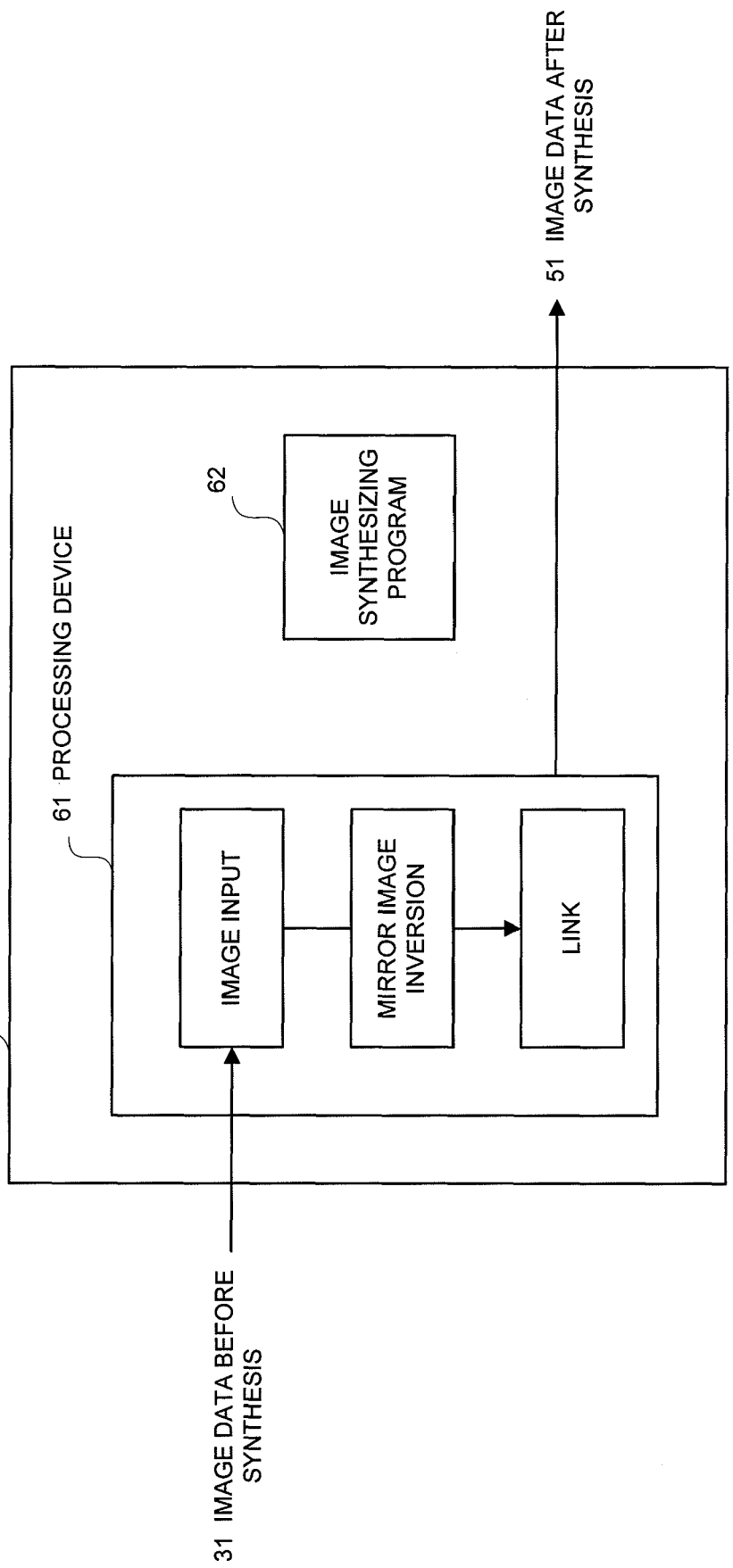
FIG. 6 is a diagram showing a configuration of an image synthesizer.

FIG. 6 shows a detailed configuration of the image synthesizer 25. The image synthesizer 25 includes a processing device 61. The processing device 61 receives either or both of the lateral face images (the right image 32 and the left image 34) of the image data 31 before synthesis, applies mirror image inversion thereto, links them to the front face image 33 to synthesize the image data 51 after synthesis, and outputs it. The processing device 61 can additionally perform other processing as mentioned below. The processing device 61 can be realized by hardware or can be realized so that a processor reads an image synthesizing program 62 stored in a storage area and executes it, and thereby, fulfills a function equivalent thereto.

Next, referring to the drawings, an operation of this exemplary embodiment will be explained.

In FIG. 2, the mirrors 11 and 12 capture images of the lateral faces of the finger 13, and reflect them in a direction of the front face. The imager 29 in the imaging system 14 concurrently images a section of the lateral faces and a section of the front face of the finger 13, which are captured on the mirrors 11 and 12.

Figure 3:
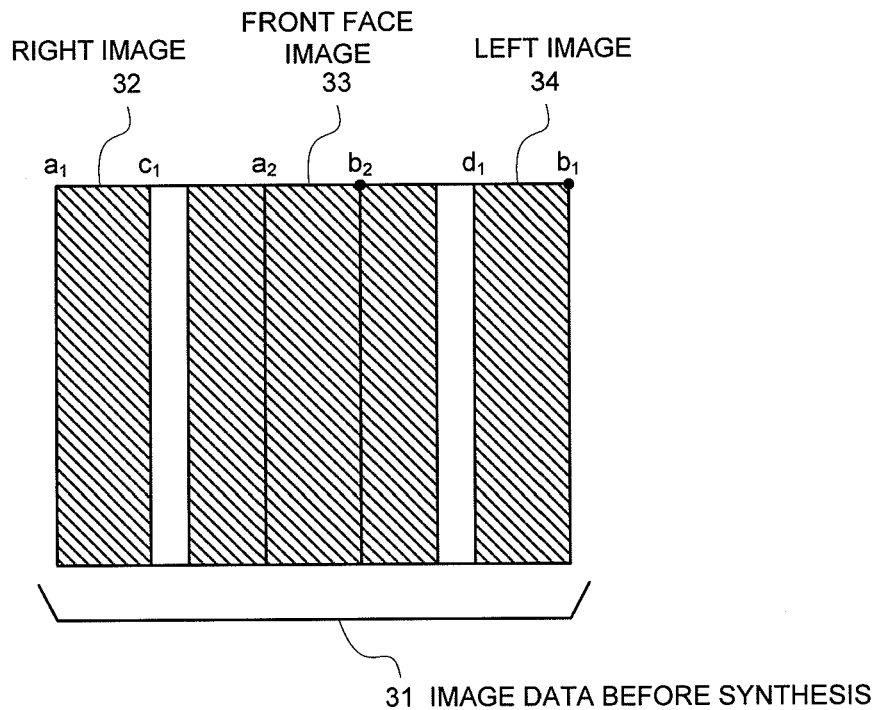
FIG. 3 is a diagram showing an image data before synthesis.

FIG. 3 shows images that were taken, or the image data 31 before synthesis. Here, to show how each part of the finger 13 appears in the image data 31 before synthesis, it is assumed that a line a, a line b, a line c and a line d that are extending in an extension direction of the finger 13 are drawn in the finger 13 as shown in FIG. 2. The line a is imaged at a position $a_2$ of the front face image 33 and a position $a_1$ of the right image 32. The line b is imaged at a position $b_2$ of the front face image 33 and a position $b_1$ of the left image 34. The line c is imaged at a position $c_1$ of the right image 32. The line d is imaged at a position $d_1$ of the left image 34. Since the line c and the line d are positioned at a back face of the finger 13, they are not imaged in the front face image 33.

FIG. 7 shows a processing flow of the image synthesizer 25. The image synthesizer 25 receives the image data 31 before synthesis, and takes out the right image 32, the front face image 33 and the left image 34 (A1). This taking-out is conducted based on hue and brightness of images (parts in white in FIG. 3) other than the finger 13, which exist between the right, front face and left images. In addition, in the biometrical feature inputting system 15 of this exemplary embodiment, a mutual distance and an angle of the mirrors 11 and 12, and a position relative to the imager 29 of the mirrors 11 and 12 are adjusted so that the images (parts in white in FIG. 3) other than the finger 13, which exist between the right, front face and left images, exist.

Figure 4:
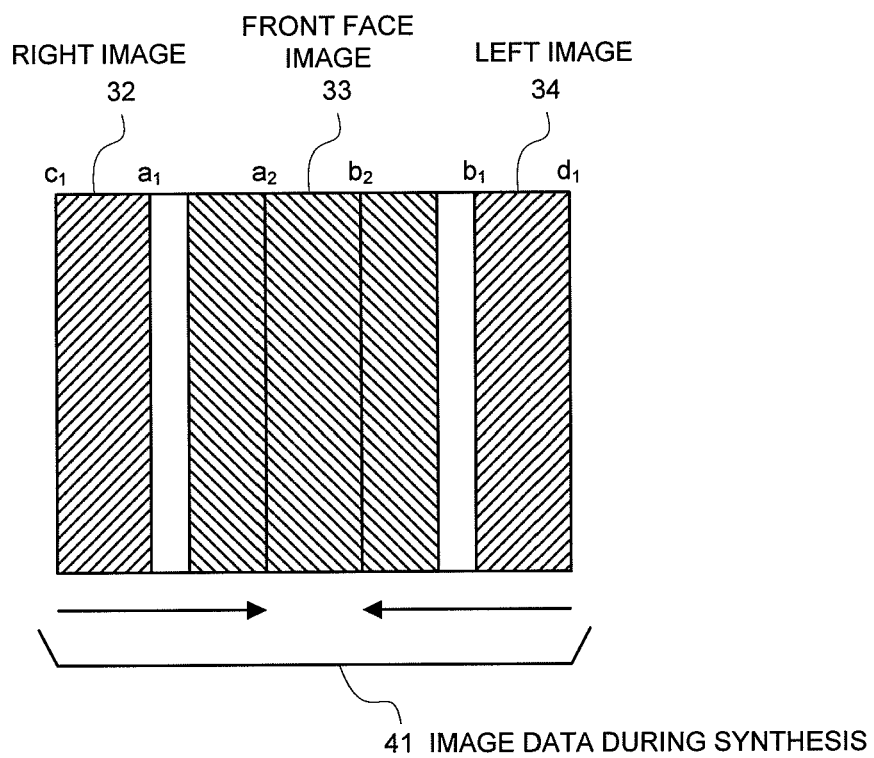
FIG. 4 is a diagram showing an image data during synthesis.

Next, the image synthesizer 25 applies mirror image inversion to the right image 32 and the left image 34 (A2). FIG. 4 shows an image data 41 during synthesis, which is a result of this processing. Here, a line $a_1$ and a line $a_2$ that are supposed to be the same position of the finger 13 lie adjacent to each other. A line $b_1$ and a line $b_2$ also lie adjacent to each other.

Thereafter, the image synthesizer 25 links the images to each other. The image synthesizer first extracts feature points of a fingerprint from the image data 41 during synthesis (A3). Since a technology for extracting feature points from an image data including a fingerprint is known to a skilled person in the art, a detailed explanation thereof will be omitted.

Next, the image synthesizer 25 links the front face image 33, the right image 32 and the left image 34 so that the feature points coincide with each other (A4). In other words, the image synthesizer superimposes the line $a_1$ and the line $a_2$ of FIG. 4 on each other, and the line $b_1$ and the line $b_2$ on each other. Particularly, the image synthesizer translates the right image 32 and the left image 34 in a direction (a direction of an arrow in a bottom part of FIG. 4) perpendicular to the extension direction of the finger 13, and finds out a position where the feature points coincide with those of the front face image 33 using a technique of pattern matching. And, the image synthesizer links the front face image 33, the right image 32 and the left image 34.

Figure 5:
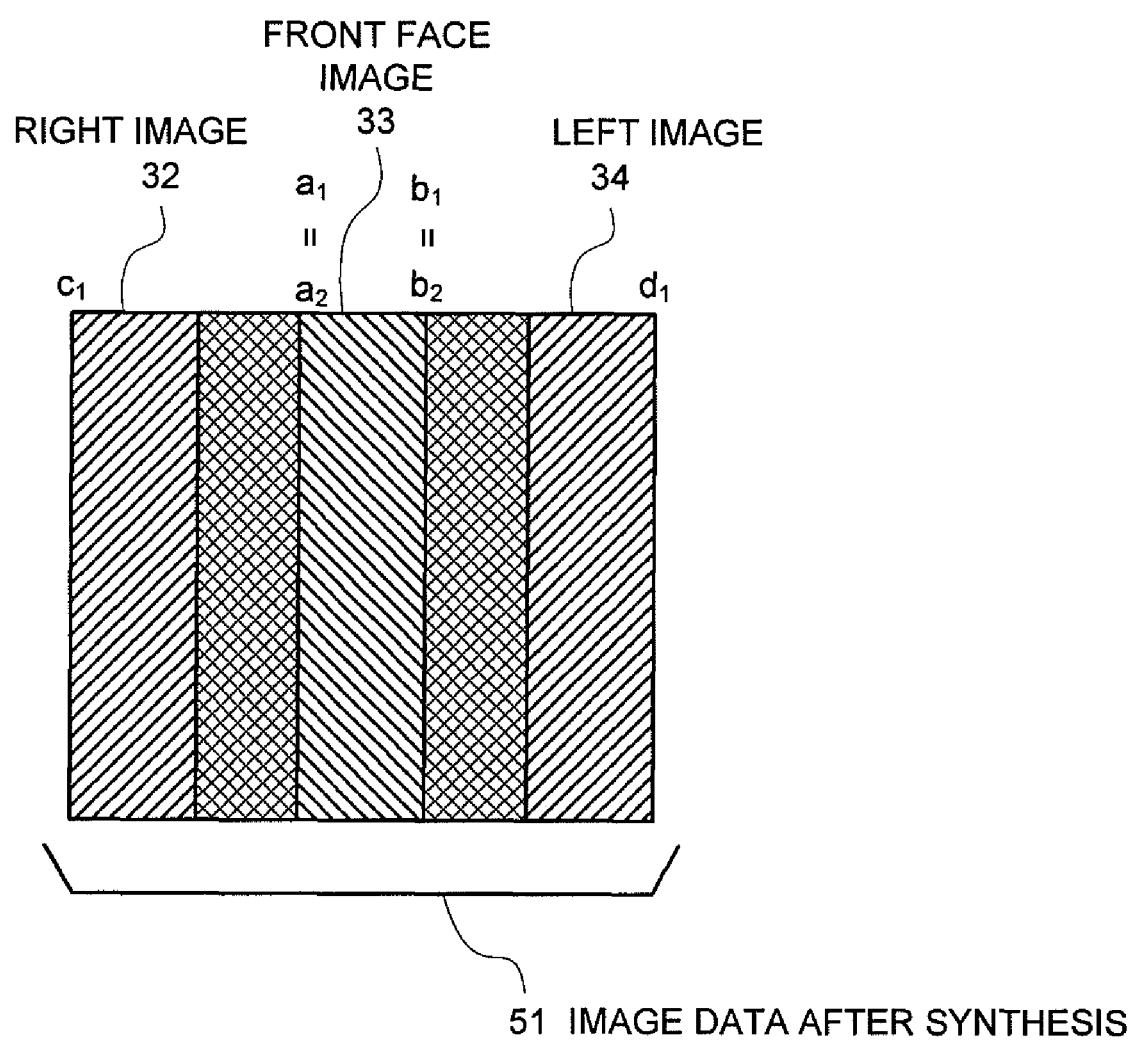
FIG. 5 is a diagram showing an image data after synthesis.

In addition, the entire coincidence of the feature points is not necessarily required. The coincidence can be established to the extent that the matching can be done. For instance, about 80% of the feature points can coincide with each other. FIG. 5 shows the image data 51 after synthesis, which is output from the image synthesizer 25 in the above-described processing.

Also, the image synthesizer 25 can be implemented so as to synthesize images other than the images of the finger 13. For instance, it can be configured that, instead of the finger 13, images of a screw, which are taken, are input, and based on a pattern of the screw, a front face image 33, a right image 32 and a left image 34 of the screw are linked to each other.

FIG. 8 shows a case where the finger 13 is rotated and obliquely placed during matching. The ball of the finger 13 is reflected from the mirror 11, and obtained by the imager 29. A lateral part thereof is obtained by the imager 29 directly.

FIG. 9 shows a case where the finger 13 is rotated in a direction opposite to the case of FIG. 8, and obliquely placed during matching. The ball of the finger 13 is reflected from the mirror 12, and obtained by the imager 29. A lateral part thereof is obtained by the imager 29 directly.

In this exemplary embodiment, since the mirrors 11 and 12, and the image synthesizer 25 are provided, advantages as described below are effected: The first advantage is that, since a fingerprint is measured from three directions, or the front face and both lateral faces of the finger 13, individual authentication can be conducted with a higher degree of accuracy than a system in which the fingerprint is measured from the front face only. The second advantage is that, since the biometrical feature such as a fingerprint of the finger 13 is measured from three directions, or the front face and both lateral faces of the finger 13, even though a measurer obliquely rotates the finger 13 unconsciously, individual authentication can be conducted.

Second Exemplary Embodiment

The biometrical feature inputting system 15 of the first exemplary embodiment provides both of the mirror 11 and the mirror 12. In the second exemplary embodiment, either one of the mirrors is provided. Since either one of the mirror 11 and the mirror 12 is not provided, the biometrical feature inputting system 15 can be realized with a compact size and cheaply. In this exemplary embodiment, since a fingerprint is measured from two directions, or the front face and either one of the lateral faces of the finger 13, individual authentication can be conducted with a higher degree of accuracy than a system in which the fingerprint is measured from the front face only. Furthermore, in this exemplary embodiment, since the fingerprint is measured from two directions, or the front face and either one of the lateral faces of the finger 13, even though a measurer obliquely rotates the finger 13 unconsciously, individual authentication can be conducted.

Third Exemplary Embodiment

FIG. 10 shows a biometrical feature inputting system 15 of the third exemplary embodiment. In this exemplary embodiment, a ceiling plate 90 is provided above both of the mirrors 11 and 12 of the first exemplary embodiment. In this exemplary embodiment, since this ceiling plate 90 is provided, the image synthesizer 25 easily separates and takes out the right image 32, the front face image 33 and the left image 34 from the image data 31 before synthesis. Because, the hue and brightness between the images (parts in white in FIG. 3) can be different from those of each of the above-mentioned images. In addition, in this exemplary embodiment, the finger 13 is inserted into the biometrical feature inputting system 15 from its front section or the like.

Fourth Exemplary Embodiment

Figure 11:
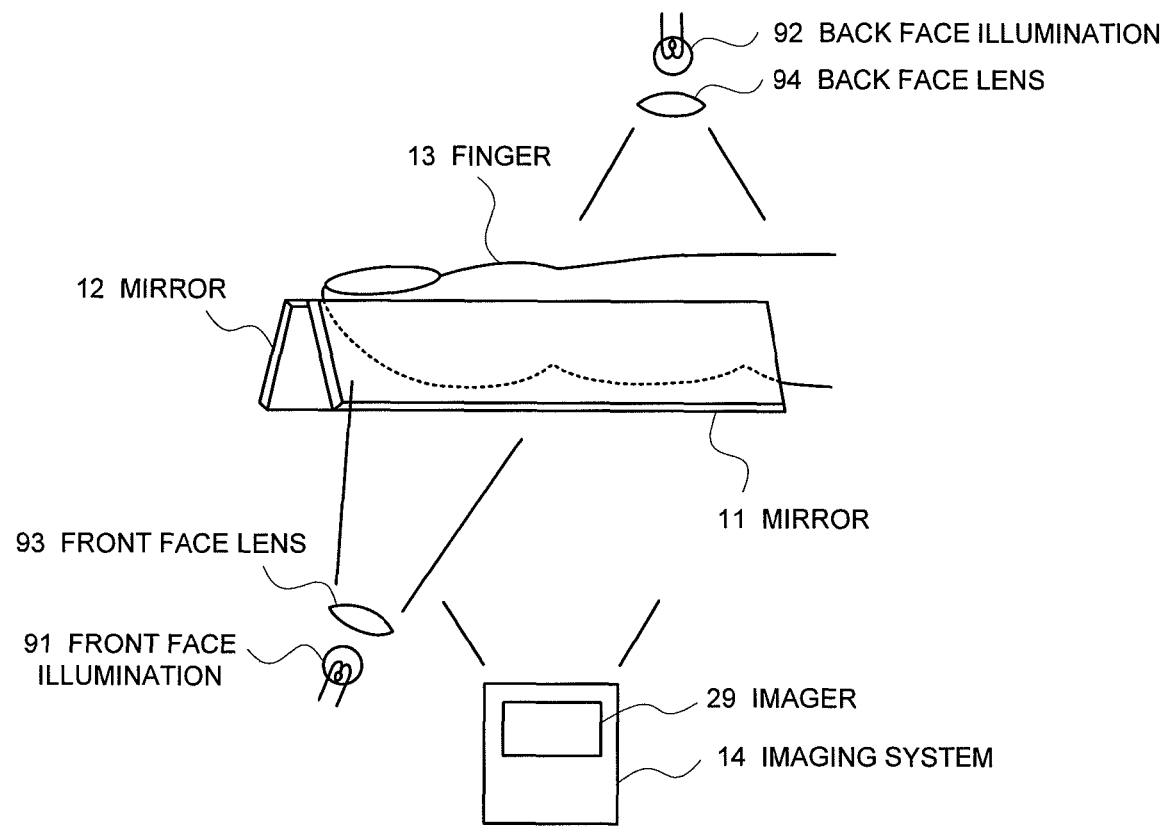
FIG. 11 is a diagram showing a configuration of a biometrical feature inputting system of a fourth exemplary embodiment.

Although the basic configuration of the fourth exemplary embodiment is the same as that of the first exemplary embodiment, it further provides a front face illumination 91 and a back face illumination 92. FIG. 11 shows its configuration.

The front face illumination 91 illuminates a front face part (usually, a ball part) of a fingertip of the finger 13, and generates a reflection image of a fingerprint that exists on a ball of the fingertip. A finger image by means of the front face illumination 91 is an image due to a reflected light. Accordingly, its wavelength characteristic can be a visible light or a near-infrared light, and can be selected in accordance with a characteristic of the imaging device 22. However, considering contamination and an ambient light, a wavelength characteristic of red or a near-infrared wavelength characteristic of about 850-960 nm is desirable. In other words, it is desirable that an LED or the like is used for the front face illumination 91. Also, it is desirable that a front face lens 93 or the like collects light, and only the ball part of the fingertip is illuminated.

The back face illumination 92 illuminates a part (so-called phalanx) between the first joint and the second joint of the finger 13 from a back side of the finger 13, and an image of a number of blood vessels that exist in this part is obtained. Also, it is desirable that a back face lens 94 or the like collects light, and only the part between the first joint and the second joint of the finger 13 is illuminated. It is desirable that a light from the back face illumination 92 has a wavelength so that it transmits the inside of the finger 13, and is absorbed by red blood in a blood vessel. An LED or the like having a wavelength characteristic of red or in a near-infrared light region of about 850-960 nm is desirable for the light source.

In this exemplary embodiment, since the front face illumination 91 and the back face illumination 92 are provided, a fingerprint and a blood vessel that are biometrical features of the finger 13 can be concurrently imaged. In this manner, in this exemplary embodiment, since the front face illumination 91 and the back face illumination 92 are provided in addition to the mirrors 11 and 12, two biometrical features of a fingerprint and a blood vessel can be imaged by one imager 29 from the front face and the lateral faces. In this exemplary embodiment, biometrical authentication can be conducted with a higher degree of accuracy than the first exemplary embodiment.

Fifth Exemplary Embodiment

Figure 12:
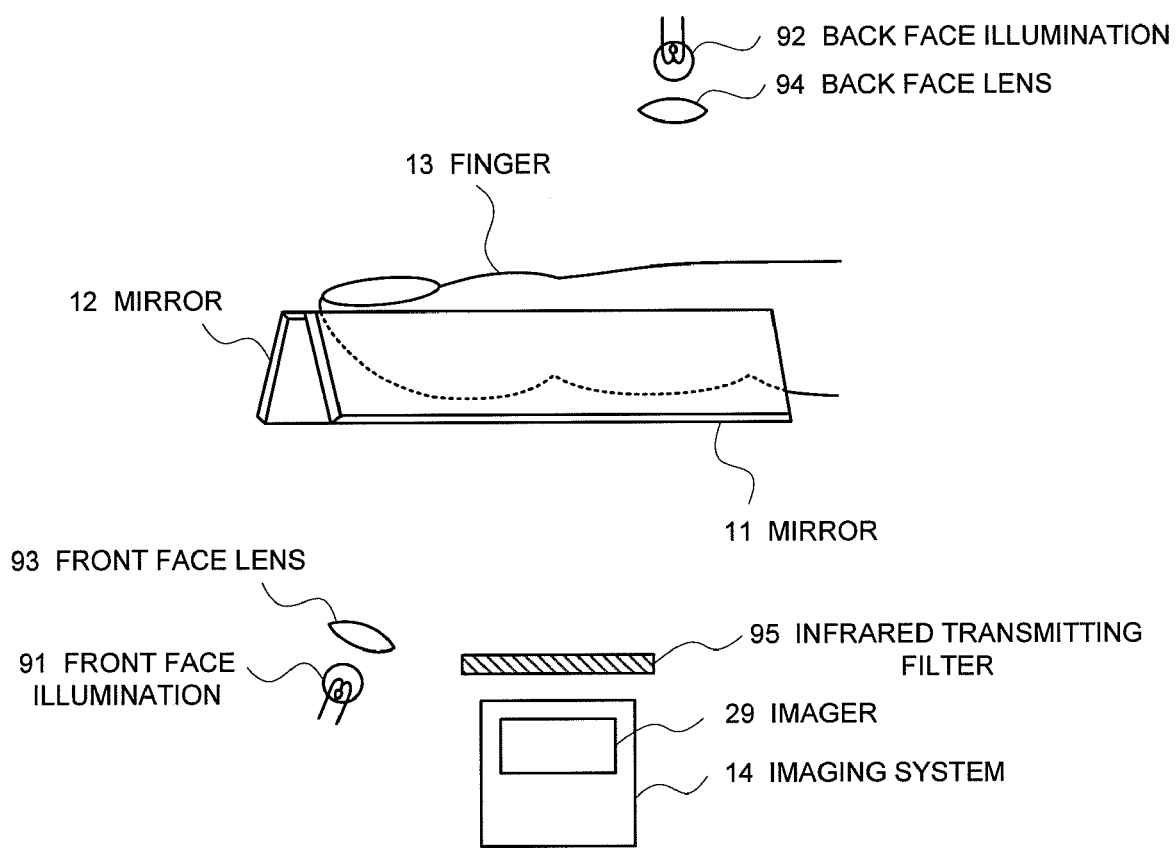
FIG. 12 is a diagram showing a configuration of a biometrical feature inputting system of a fifth exemplary embodiment.

In the fifth exemplary embodiment, a near-infrared light having a wavelength of about 850-960 nm is used for the lights of the front face illumination 91 and the back face illumination 92 in the fourth exemplary embodiment, and an infrared transmitting filter 95 for cutting a light in a visible region is provided between the finger 13 and the imager 29. FIG. 12 shows a configuration of this exemplary embodiment. In this exemplary embodiment, by using the infrared transmitting filter 95, an ambient light such as a fluorescent lamp for indoor lighting can be prevented.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A biometrical feature inputting system comprising:
    an imager placed in front of a finger, for imaging an image of a front face of said finger, and an image of at least one lateral face of said finger;
    a reflector placed on a side of said at least one lateral face of said finger, for reflecting an image of said at least one lateral face of said finger to said imager; and
    a synthesizer for digitally applying mirror inversion to said reflected image of said at least one lateral face of said finger, and synthesizing a mirror-inverted image of said reflected image and an imaged image of said front face of said finger.

2. A biometrical feature inputting system according to claim 1, wherein said synthesizer performs synthesis based on feature points extracted from said imaged image of said front face of said finger and said mirror-inverted image.

3. A biometrical feature inputting system according to claim 2, wherein said synthesizer translates said mirror-inverted image in a direction perpendicular to an extension direction of said finger, and conforms said feature points extracted from said imaged image and said mirror-inverted image to each other and links images to perform synthesis.

4. A biometrical feature inputting system according to claim 1, wherein said reflector comprises two reflecting plates, each extending in a extension direction of said finger, wherein one of said two reflecting plates is placed on each side of two lateral faces of said finger, and a distance between said reflecting plates on a side of a front face of said finger is greater than a distance between said reflecting plates on a side of a back face of said finger.

5. A biometrical feature inputting system according to claim 1, further comprising:
    a first light source which illuminates said front face of said finger; and
    a second light source which illuminates a back face of said finger.

6. A biometrical feature inputting system according to claim 5, wherein a light of said second light source illuminates a part between a first joint and a second joint of said finger from a back direction of said finger.

7. A biometrical feature inputting system according to claim 5, wherein a wavelength of light emitted by said first light source and said second light source is 850 nm to 960 nm, and
    said system further comprises has an infrared transmitting filter placed between said finger and said imager.

8. An image synthesizing apparatus comprising:
    an input section which receives a first image and a second image separately from each other on an identical plane; and
    a synthesizer which digitally applies mirror inversion to said first image, and links said mirror-inverted first image to said second image, thus synthesizing a synthesized image wherein said second image is a front face image of a finger, and said second image is an image of a lateral of said finger, and said synthesizer links said mirror-inverted first image to said second image based on feature points extracted from said mirror-inverted first image and said second image.

9. An image synthesizing apparatus according to claim 8, wherein said synthesizer translates said mirror-inverted first image in a direction perpendicular to an extension direction of said finger, and conforms said feature points of said mirror-inverted first image and said second image to each other, thus synthesizing said combined image.

10. An image synthesizing method comprising steps of:
    inputting a first image and a second image separately from each other on an identical plane;
    digitally applying mirror inversion to said first image; and
    synthesizing an image by linking said mirror-inverted first image to said second image wherein said first image is a front face image of a finger, and said second image is an image of a lateral face of said finger, and said synthesizing step includes a step of conducting link based on feature points extracted from said first image and said second image to perform synthesis.

11. An image synthesizing method according to claim 10, wherein said synthesizing comprises translating said mirror-inverted first image in a direction perpendicular to an extension direction of said finger, and conforming feature points of said mirror-inverted first image to feature points of said second image and conducting said linking.

12. The biometrical feature inputting system according to claim 1, wherein the imaged image of said front face of said finger is not inverted.

13. The image synthesizing method according to claim 10, wherein the second image is not inverted.

14. The biometrical feature inputting system according to claim 1, wherein the image of said at least one lateral face is an image of a lateral plane, and said image of said front face is an image of a front plane, different from said lateral plane.

15. The image synthesizing method according to claim 10, wherein the first image is of a front plane and the second image is of a lateral plane, different from the front plane.

16. The image synthesizing apparatus according to claim 8, wherein said synthesizer links said mirror-inverted first image to said second image to an extent that matching between the synthesized image and a recorded image can be performed.

17. The image synthesizing method according to claim 10, wherein said synthesizing comprises linking said mirror-inverted first image to said second image to an extent that matching between a resultant synthesized image and a recorded image can be performed.

* * * * *